United States Patent
Ehrhardt (10) Patent No.: US 9,754,505 B2
(45) Date of Patent: Sep. 5, 2017

(54) METHOD FOR TRAINING STAFF IN QUALITY CONTROL

(71) Applicant: F. Hoffmann-La Roche AG, Basel (CH)

(72) Inventor: Alexandra Ehrhardt, Wiesloch (DE)

(73) Assignee: F. HOFFMANN-LA ROCHE AG, Basel (CH)

( * ) Notice: Subject to any disclaimer, the term of this patent is extended or adjusted under 35 U.S.C. 154(b) by 282 days.

(21) Appl. No.: 14/490,306

(22) Filed: Sep. 18, 2014

(65) Prior Publication Data

US 2015/0004569 A1    Jan. 1, 2015

Related U.S. Application Data

(63) Continuation of application No. PCT/US2013/056543, filed on Mar. 27, 2013.

(30) Foreign Application Priority Data

Mar. 29, 2012  (EP) .................................. 12162162

(51) Int. Cl.
*G09B 19/00* (2006.01)
*G09B 9/00* (2006.01)

(52) U.S. Cl.
CPC .............. *G09B 9/00* (2013.01); *G09B 19/00* (2013.01); *G09B 19/003* (2013.01)

(58) Field of Classification Search
USPC ......... 434/218, 219, 226, 365; 206/438, 439
See application file for complete search history.

(56) References Cited

U.S. PATENT DOCUMENTS 5,722,835 A * 3/1998 Pike .................... G09B 9/00
                                                        434/218
5,781,284 A    7/1998 Infante
(Continued)

FOREIGN PATENT DOCUMENTS

CN    1129984 A    8/1996
CN    1291350 A    4/2001
(Continued)

OTHER PUBLICATIONS

English Translation of the International Preliminary Report on Patentability and Written Opinion of the International Searching Authority, PCT/EP2013/056543, dated Oct. 9, 2014.
(Continued)

*Primary Examiner* — Kurt Fernstrom
(74) *Attorney, Agent, or Firm* — Bose McKinney & Evans LLP (57)    ABSTRACT

A method for training staff for quality control when filling amorphous products into primary packaging. The method includes a provision step during which a test set having a plurality of primary packages filled with an amorphous product is provided, wherein at least one of the filled primary packages is afflicted by a contaminant comprising a fluorescent marker. A training step includes presenting the test set to a person to be trained, who carries out a visual quality control for detecting contaminants. The result of the training step is documented. A verification step is conducted during which the test set is irradiated by excitation light, wherein fluorescing contaminants are detected and the result of the verification step is documented. A comparison step is done during which the result of the training step and the result of the verification step are compared. Also disclosed is an inventive test kit and test set.

5 Claims, 3 Drawing Sheets

(56) References Cited

U.S. PATENT DOCUMENTS

| | | | | |
|---|---|---|---|---|
| 5,939,619 A * | 8/1999 | Achter | .............. | A61L 2/28 |
| | | | | 73/40.7 |
| 5,972,638 A * | 10/1999 | Burlage | .............. | F41H 11/12 |
| | | | | 434/4 |
| 6,027,344 A * | 2/2000 | Johanns | .............. | G09B 9/00 |
| | | | | 434/219 |
| 2006/0118741 A1 | 6/2006 | Ross et al. | | |
| 2008/0011636 A1* | 1/2008 | St. John | .............. | A61K 8/19 |
| | | | | 206/449 |
| 2009/0012825 A1* | 1/2009 | Ng | .............. | G06Q 10/06 |
| | | | | 705/7.32 |
| 2009/0271243 A1* | 10/2009 | Sholl | .............. | G06Q 30/018 |
| | | | | 434/365 |
| 2012/0189992 A1* | 7/2012 | Craig | .............. | G01N 21/8803 |
| | | | | 434/219 |

FOREIGN PATENT DOCUMENTS

| | | |
|---|---|---|
| WO | WO 94/04918 A1 | 3/1994 |
| WO | WO 95/01568 | 1/1995 |
| WO | WO 99/17486 A1 | 4/1999 |
| WO | WO 99/35688 | 7/1999 |
| WO | WO 2011/052322 A1 | 5/2011 |

OTHER PUBLICATIONS

Jun. 29, 2016 Office Action in CN 201380017727.4 (11 pages) and English translation (11 pages).
Akers, et al., Parenteral Quality Control, Sterility, Pyrogen, Particulate, and Package Integrity Testing, Third Edition, Revised and Expanded, pp. 210-221, Marcel Dekker, Inc, 2003

* cited by examiner

Fig. 3

METHOD FOR TRAINING STAFF IN QUALITY CONTROL

RELATED APPLICATIONS

This application is a continuation of PCT/EP2013/056543, filed Mar. 27, 2013, which claims priority to EP 12 162 162.7, filed Mar. 29, 2012, both of which are hereby incorporated herein by reference in their entireties.

BACKGROUND

The invention relates to a method for training staff for quality control when filling amorphous products into primary packaging means. Furthermore, the invention relates to a test set for training staff for quality control when filling amorphous products into primary packaging means, and to a kit which comprises the test set and a UV light source. Furthermore, the invention relates to a use of a test set and a method for producing a test set. Devices and methods in accordance with this disclosure can be used, in particular, in the pharmaceutical industry to train staff used in quality control when filling amorphous products. The amorphous products can, in particular, be pharmaceutical products, for example diagnostic products and/or therapeutic products. In particular, this can relate to amorphous products in the form of fluid media, in particular in the form of liquids. In addition to use in the pharmaceutical industry, applications of this disclosure are also possible in medicine, in the natural sciences, in engineering or in other fields, for example within the scope of packaging foodstuffs.

The prior art has disclosed a multiplicity of methods and devices, by means of which amorphous products, in particular homogeneous amorphous products such as, e.g., liquids, can be packaged in appropriate primary packaging means, in particular in vessels. Particularly in the field of pharmaceutical products and the filling thereof into appropriate primary packaging means, such as syringe bodies, glasses, phials or similar vessels, quality control plays a significant role. Thus, automated or manual quality controls have to be carried out in many cases before, during or after filling of the amorphous products into the primary packaging means, within the scope of which quality controls the primary packaging means with the products contained therein are examined for contaminants and/or damage.

In the following text, reference is made in particular and without restricting further fields of use to the packaging of pharmaceutical products in particular, i.e., therapeutic and/or diagnostic products and, in particular, medicaments. In particular, this can relate to liquid medicaments. In particular, the medicaments can be parenteral medicaments or so-called parenterals, i.e., medicaments which are administered by means of an injection. In the case of such parenterals, there generally is a requirement for quality control in which 100% of the filled primary packaging means are controlled, i.e., in which no filled primary packaging means are brought into circulation without quality control.

In general, the quality control can take place in an automated manner in particular. By way of example, the automated quality control can comprise an automated optical quality control, for example by means of appropriate camera systems and optionally by means of appropriate image evaluation systems. Such automated quality controls can be used, in particular, in the field of a line production.

However, as an alternative or in addition to an automated quality control, there is also quality control by appropriately trained staff in many sectors having the filling of primary packaging means with parenterals. In the following text, such non-automated quality control by trained staff is also referred to as "manual quality control" or "human quality control". Such a human quality control can take place, in particular, in the case of batch productions with a low volume.

However, before employment in manual quality control, the staff employed for this must be appropriately trained. Thus, in the case of manual optical control of parenterals, the staff used for this activity are generally trained with the aid of prepared test sets. As a result of this training, the staff must be able to reliably identify contaminants and damage. The test sets used for this purpose for example contain a plurality of primary packaging means (primary packages) such as pre-filled syringes and/or phials (vials), which are filled with the amorphous product or a model product (no distinction is made in the following in relation to the test set), for example a model solution. Additionally, at least one fault is provided in each case in some or a number of the primary packaging means of the test set, which fault must be identified by the staff. In particular, this fault can be a contaminant and/or a different type of fault, for example damage and/or a faulty packaging such as, e.g., a faulty closure of the primary packaging means. By way of example, different particles with various sizes, such as, e.g., metal chips, plastic splinters, glass splinters, fibers or hairs, are introduced into the test sets. These contaminants and/or this damage must be dependably and reliably identified by the staff to be trained. By way of example, a test set can be configured in such a way that 20 to 30% of the filled primary packaging means of this test set have appropriate faults.

However, when assessing a training result, there can, in practice, repeatedly be an incorrect assessment. Thus, in particular, the case may occur where particles are not identified because they cannot be identified by the staff to be trained. By way of example, particles may be hidden in the meniscus of a surface of the amorphous medium or in frothing. Furthermore, particles may be hidden in recesses in the primary packaging means, for example between a plug and a glass wall and/or in a needle. Such cases of non-identification of the particles should, in principle, be separated out when evaluating the training success from a non-identification due to lack of attentiveness by the staff to be trained; however, this is not possible in practice in conventional training methods. As a result of this lack of ability to distinguish between inadequate training results which can be traced back to the lack of attentiveness and inadequate training results which can be traced back to an, in principle, impossibility of identification of the contaminant, an evaluation of the training success is hardly possible in many cases, and the corresponding circumstances can only be elusive.

SUMMARY

This disclosure provides a method and a test set for training staff for quality control when filling amorphous products into primary packaging means, which at least largely avoids the disadvantages of known methods and test sets. In particular, a checking of the training success is made possible to the effect that a non-identification of faults due to lack of attentiveness of the staff to be trained can be distinguished from a non-identification of faults due to an, in principle, impossibility of identification of the faults.

In general, reference is made to the fact that, in the following text, the verbs "to have" and "to comprise" and grammatical variations of these verbs are used in such a way that they can have an exclusive or non-exclusive meaning. Thus, the expression "A comprises B" or the expression "A has B" can mean, on the one hand, that A consists exclusively of B, i.e., A comprises no further components in addition to B. Alternatively, the respective expression can also be used in a non-exclusive manner, to the effect that A comprises at least one further component in addition to B.

In a first aspect of this disclosure, a method is proposed for training staff for quality control when filling amorphous products into primary packaging means. As explained above, the amorphous products can, in particular, be homogeneous amorphous products. In particular, the amorphous products can be present in fluid form, for example as a liquid, in particular as a transparent liquid. Here, in general, a primary packaging means (primary package) is understood to mean a packaging means which has at least one interior for holding the amorphous products. In particular, this can be a primary packaging means which can be closed off. In particular, the primary packaging means can comprise at least one vessel in which the amorphous product can be held. Here, in general, filling is understood to mean a process during which the amorphous product is introduced into the primary packaging means, in particular into an interior of the primary packaging means. Subsequently, the primary packaging means can optionally be closed off, for example by welding and/or by a plug. Examples of appropriate primary packaging means are yet to be explained in more detail below. In particular, the quality control can be carried out before and/or during and/or after the filling of the amorphous products into the primary packaging means.

The proposed method comprises the steps set forth in the following text. The mentioned steps can in particular, albeit not necessarily, be carried out in the specified sequence. However, a different sequence is also, in principle, possible. Furthermore, the proposed method can comprise additional method steps not set forth below. Furthermore, individual ones, some or all method steps can also be carried out repeatedly. Furthermore, individual ones or some of the method steps described below can be carried out in succession, with time overlap or simultaneously.

The method comprises at least one provision step (method step a). In the provision step, at least one test set of filled primary packaging means is provided. The test set comprises a plurality of primary packaging means filled with the product. Here, at least one primary packaging means of the filled primary packaging means is furthermore afflicted by at least one contaminant, wherein the contaminant comprises at least one fluorescent marker.

Within the scope of this disclosure, provision is understood in general terms to mean a process in which the test set is produced or made available in such a way that it can be used in the subsequent method steps, in particular in the training step and/or verification step described below.

A test set is understood in general terms to mean a plurality of primary packaging means (also referred to herein as primary packages). By way of example, the test set can comprise a plurality of similar primary packaging means, for example a plurality of at least 5 primary packaging means, in particular of at least 10 primary packaging means and particularly preferably of at least 50 primary packaging means. Exemplary embodiments are yet to be specified in more detail below.

Here, a filled primary packaging means is understood to mean a primary packaging means filled with the respective product, wherein the product is introduced into at least one interior of the primary packaging means. As explained above, no distinction is made when referring to the test set between the case where the product is the actual amorphous product, for the filling of which the staff are to be trained, and the case, likewise comprised by this disclosure, where the product is a "dummy product" or "replacement product." By way of example, the latter case can contain a replacement substance being introduced into the primary packaging means in place of the actual amorphous product, for example a replacement substance in liquid form which, under visual inspection by the human eye, has the same properties as the amorphous product to be used in actual fact later during the filling.

Within the scope of this disclosure, an amorphous product is understood in general terms to mean a product or a replacement substance, only used for training purposes, for this product, which is present in an amorphous form, that is to say, for example, a liquid and/or a gas and/or an amorphous solid such as, e.g., a powder. In particular, the amorphous product can be a fluid amorphous product, for example a liquid. In particular, the amorphous product can be an amorphous product at least partly transparent in the visible spectral range.

The test set comprises at least one primary packaging means which is afflicted by the at least one contaminant. Here, the test set can in general comprise one or more primary packaging means in a form where they are filled with the amorphous product, with said primary packaging means being afflicted by the same contaminant or the same type of contaminant. Alternatively, the test set can also comprise a plurality of primary packaging means which are afflicted by different types of contaminants. Furthermore, the test set can also comprise at least one primary packaging means which is afflicted by a plurality of different contaminants.

Within the scope of this disclosure, a contaminant is understood in general terms to mean at least one foreign body which differs from the amorphous product and which is not wanted in the interior of the primary packaging means filled with the amorphous product. In particular, this contaminant, as will be explained in more detail below, can comprise particles, fibers, hairs or other types of contaminants. A filled primary packaging means afflicted by at least one contaminant is therefore to be understood to mean a primary packaging means, the interior of which includes the at least one contaminant in addition to the at least one amorphous product.

Within the scope of this disclosure, a fluorescent marker is understood in general terms to mean a chemical element or chemical compound which emits fluorescent light under the influence of excitation light. By way of example, the fluorescent marker can comprise at least one fluorescent dye and/or at least one fluorescent chemical compound and/or group. The dye can be a constituent of the contaminant and/or mixed into the contaminant in such a way that the fluorescent marker and further constituents of the contaminant form a mixture, and/or the fluorescent marker can be bound chemically and/or physically to the contaminant, for example by covalent bonds and/or complex bonds and/or adsorption and/or absorption and/or ionic bonds. Examples of fluorescent dyes, which can also be used within the scope of this disclosure, are fluorescent dyes selected from the group consisting of coumarins, fluorescein, rhodamines and stilbenes. Combinations of the aforementioned dyes and/or other dyes can also be used.

It is particularly preferred if, as will be explained in more detail below, the contaminant comprises a contaminant, in particular a non-fluorescing contaminant, which is marked with the fluorescent marker. This renders it possible, for example, to use contaminants typically occurring when filling amorphous products into primary packaging means, which contaminants are subsequently marked with at least one fluorescent marker. By way of example, such contaminants can comprise particles. By way of example, these contaminants can be marked by impregnating and/or wetting and/or by a different type of marking with one or more fluorescent markers. As will be explained in more detail below, use can be made of, in particular, at least one fluorescent lacquer, in particular a UV-lacquer, in order to provide contaminants with at least one fluorescent marker such that fluorescing contaminants are created.

Furthermore, the method comprises at least one training step (method step b). In the training step, the test set described above is presented to at least one person to be trained. This person is intended to subsequently be employed for quality control when filling amorphous products into primary packaging means. A training step is understood here in general terms to mean an education process, in which the person to be trained is prepared for employment in quality control by means of appropriate educational methods. In particular, the training step can occur under conditions which are as realistic as possible.

In the training step, the person to be trained carries out a visual quality control on the test set presented to them in order to detect contaminants. A visual quality control can in general terms be understood to mean a quality control in which the person to be trained attempts, with the naked eye and/or with the eye and one or more optical aids such as a magnifying glass and/or a microscope, to identify contaminants in the filled primary packaging means of the test set. By way of example, the person to be trained can mark and/or sort out filled primary packaging means in which contaminants were identified, and/or note in a list or database that the respective primary packaging mean is afflicted by a contaminant. By way of example, the primary packaging means can be marked, for example with identification numbers and/or different types which enable an identification of the primary packaging means.

The result of the training step is documented. In particular, this can mean that whether the person to be trained has correctly identified the states of the filled primary packaging means of the test set is documented. In general, a state of a filled primary packaging means of the test set can be understood to mean, e.g., a lack of faults or an affliction with faults, wherein, in the case of an affliction with faults, that can moreover be a distinction as to whether these faults consist of an affliction with one or more contaminants, possibly in combination with the respective type of contaminant, and/or whether different types of fault are present, for example damage to the filled primary packaging means, for example in the form of damage to the primary packaging means by tears, holes or other types of damage and/or by an inadequate closure of the primary packaging means, for example by an incorrectly inserted plug. By way of example, when documenting the result of the training step, it is possible to record for each one of the filled primary packaging means whether the person to be trained has correctly identified the state of the filled primary packaging means, including possible faults, and whether, if necessary, the present faults were correctly and completely identified. Herein, it is possible to document, for example, whether faults, in particular contaminants, present in one or more of the filled primary packaging means were not identified and/or whether faults not present were incorrectly identified as such.

The result of the training step can be documented, e.g., in the form of a log, for example in paper form and/or in electronic form, for example in the form of a list, in particular an electronic list and/or database, in which the filled primary packaging means and the respective result of the visual quality control for this filled primary packaging means are recorded.

Furthermore, the method comprises at least one verification step (method step c). Within the scope of this disclosure, a verification step is understood in general terms to mean a method step in which a result obtained in a different manner is checked. In the verification step, the test set is irradiated by excitation light. Within the scope of this disclosure, excitation light is understood in general terms to mean light in the ultraviolet and/or blue spectral range, for example ultraviolet light in the spectral range from 100 nanometers to 400 nanometers, in particular in the spectral range from 200 nanometers to 400 nanometers and particularly preferably in the spectral range from 280 nanometers to 380 nanometers, and/or blue light in the spectral range from 380 nanometers to 480 nanometers, which is suitable to excite fluorescence in the fluorescent marker contaminant.

When the test set is irradiated within the verification step, the whole test set can be irradiated simultaneously by excitation light, or individual or some elements of the test set can be irradiated in succession by the excitation light. By way of example, the excitation light can be generated by at least one excitation light source, for example a UV-lamp. By way of example, the primary packaging means of the test set can be introduced in succession into the radiation from the excitation light.

Fluorescing contaminants of the test set are detected in the verification step. Fluorescing contaminants are to be understood to mean the contaminants, of the test set, provided with the fluorescent marker. By way of example, the fluorescing contaminants can once again be detected optically, in particular, once again, by the naked eye and/or with one or more optical aids such as, e.g., a magnifying glass and/or microscope and/or a camera.

The result of the verification step is documented. By way of example, this documentation can include that fluorescing contaminants were detected during the verification step in certain primary packaging means, and optionally the position of these fluorescing contaminants and/or the nature thereof. Hence, the result of the verification step can, e.g., once again be documented in the form of a list and/or database, where a note is made for each filled primary packaging means of the test set as to whether fluorescing contaminants were detected during a verification step, and optionally the number and/or the type of the fluorescing contaminants and/or the position of the fluorescing contaminant. Once again, the list can be available, e.g., in paper form or else in an electronic form.

It is particularly preferable for appropriate documentation also to take place in the at least one provision step. Thus, it is possible in the provision step to document for each one of the filled primary packaging means whether the latter is afflicted by one or more faults, and optionally the type of fault. In particular, it is possible to document for each filled primary packaging means whether it has at least one contaminant and/or at least one other type of fault, and optionally the number and/or type and/or position of the fault. In this embodiment, there are preferably three documentations after carrying out the method step c), namely a documentation of the provision step (also referred to as test set documentation in the following text), in which the actually present fault was documented, a documentation of the training step (also referred to as training documentation in the following text) and a documentation of the verification step (also referred to as verification documentation in the following text). However, a configuration with merely two documentations, namely the documentation of the training step and the documentation of the verification step, is, in principle, possible.

Furthermore, the method comprises at least one comparison step (method step d). In the comparison step, the result of the training step and the result of the verification step are compared. By way of example, the documentation of the training step and of the verification step can be compared to one another in the comparison step. Here, a comparison should be understood, in particular, to mean a process in which similarities and/or differences in the documentations are determined.

In particular, the comparison step can be configured in such a way that a determination is made as to whether the person to be trained has correctly identified faults in the test set during the training step. By way of example, a documentation of method step b) can, for this purpose, be compared to a documentation of method step a). In the process, it is possible to determine deviations which include that the person to be trained has not identified a fault, i.e., a contaminant and/or another type of fault, or has incorrectly identified a fault which was not present at such. If this is the case, it is additionally possible to use the result of the verification step, in particular the documentation of the verification step, to check the training result. By way of example, by comparing the result of the verification step with the result of the training step, it is possible to check whether the person to be trained could even identify faults. In particular, it is possible to check whether a non-identified contaminant, as explained above, is arranged in a region of the primary packaging means which cannot be seen, or can only be seen with great difficulties, by the staff to be trained, for example in a meniscus of the amorphous product and/or in a foam and/or in an interspace between a closure and a vessel wall of the primary packaging means. If this is the case, the training result can, for example, be corrected in relation to this non-identified fault to the effect that the non-identification of this fault, in particular the non-identification of the respective contaminant, is not considered and/or connected with the lower weighting when evaluating the training result, and so the training result is corrected.

The method can be advantageously developed in various ways. As mentioned above, the product can, in particular, be selected from the group consisting of: a diagnostic agent, in particular a liquid diagnostic agent; a therapeutic agent, in particular a liquid therapeutic agent; a medicament, in particular a liquid medicament and particularly preferably a parenteral medicament. In particular, the amorphous product can therefore contain a parenteral.

The primary packaging means may, in particular, comprise vessels. Here, a vessel is understood to mean a packaging means which comprises at least one interior which is surrounded by at least one vessel wall. In particular, the vessel can be embodied to be completely closed and/or it can have at least one closure, by means of which the vessel can be closed off, for example at least one cap and/or at least one plug. In particular, the primary packaging means may comprise vessels selected from the group consisting of: syringe bodies; phials (vials), glasses; carpules.

The plurality of primary packaging means of the tests set, filled with the amorphous product, can comprise in particular similar, preferably identical, primary packaging means. It is particularly preferable for the amorphous product also to be identical in all filled primary packaging means of the test set.

In particular, as explained above, documentation relating to the affliction of the filled primary packaging means with the contaminants (test set documentation) can be generated in the provision step (method step a). In addition to the contaminants, it is also possible to document further faults in the process.

Thus, within the meaning of this disclosure, the generic term of a fault comprises all properties and states of a filled primary packaging means which are not in order or not according to instructions. For these faults, a distinction is made between contaminants and "further faults", i.e., faults which are not caused by contaminants. In particular, the further faults can relate to damage or incorrect closure of the primary packaging means. As explained above, the documentation can, in particular, comprise a list of the primary packaging means of the test set and optionally a list of the respective faults.

As explained above, the faults can, in general, comprise one or more contaminants and/or one or more further faults, for example damage. Thus, it is possible, firstly, to record for each primary packaging means whether it has a fault. If a fault is present, the type of fault can be recorded. By way of example it is possible to record whether the fault is a contaminant or another fault, for example damage. Furthermore, it is possible, optionally, to record the type of contaminant and/or damage, for example whether this is a particle and/or a different type of contaminant. Furthermore, it is also possible to record the number of possible contaminants, such as, e.g., a number of particles. Furthermore, in respect of optionally present other faults, it is possible to record what type of fault this is, i.e., for example, a tear and/or an incorrectly applied closure. Furthermore, it is also possible to record the position of the other faults. Furthermore, it is naturally also possible to record if a primary packaging means of the test set is without faults in this documentation.

In a further embodiment of the proposed method, method step a) is carried out in such a way that a plurality of the primary packaging means of the test set, filled with the product, are free from contaminants. In particular, a plurality of the primary packaging means of the test set, filled with the product, can be completely free from faults, i.e., free from contaminants and free from other faults. Furthermore, the test set can comprise primary packaging means which merely have one or more contaminants as faults. Furthermore, the test set can comprise primary packaging means which merely have one or more further faults. Furthermore, the test set can comprise one or more primary packaging means which have both one or more contaminants and one or more further faults. However, a plurality of the primary packaging means of the test set, filled with the product, particularly preferably remain completely free from faults.

In particular, the test set can comprise a contaminant-free number of primary packaging means filled with the product and a contaminant-afflicted number of primary packaging means filled with the product. Furthermore, the test set can, in general, comprise a fault-free number of primary packaging means filled with the product and a fault-afflicted number of primary packaging means filled with the product. By way of example, the fault-afflicted number of primary packaging means filled with the product can comprise a number of primary packaging means filled with the product, afflicted by one or more contaminants and/or a number of primary packaging means filled with the product, afflicted by further faults and/or a number of primary packaging means afflicted both by one or more contaminants and by one or more further faults.

The contaminant-afflicted number of the primary packaging means filled with product can, in particular, form a portion of 5% to 50% of all the primary packaging means filled with the product, of the test set, in particular a portion of 10% to 40% and particularly preferably a portion of 20% to 30%. The number generally afflicted by faults of the primary packaging means filled with the product can also form a portion of 5% to 50% of all the primary packaging means filled with the product, of the test set, in particular a portion of 10% to 40% and particularly preferably a portion of 20% to 30%.

As explained above, at least one primary packaging means of the test set can furthermore be afflicted by at least one further fault, in particular a fault selected from the group consisting of an incorrect closure of the primary packaging means and damage to the primary packaging means, in particular a tear.

In particular, the test set can comprise at least 5 primary packaging means. The test set can particularly preferably comprise 10 to 1000 primary packaging means filled with the product, in particular 50 to 200 and particularly preferably 100 primary packaging means filled with the product. However, in principle, other embodiments of the test set are also possible.

As explained above, the contaminant can be embodied in various ways. In particular, the contaminant can comprise at least one particle. Here a particle is in general terms understood to mean a particle with, in principle, any form. In particular, the particle can be a coherent solid body. The at least one particle can, in particular, comprise one or more particles, selected from the group consisting of: at least one fiber; at least one hair; at least one chip, in particular at least one metal chip and/or at least one wood chip and/or at least one plastic chip; at least one glass particle; at least one wood particle; at least one metal particle; at least one ceramics particle; at least one plastic particle.

In particular, the particle can have diameter or equivalent diameter of 100 µm to 500 µm. Alternatively or additionally, the particle can have an extent in at least one dimension which is at least 50 µm, preferably at least 100 µm, for example 50 µm to 3 mm, in particular 100 µm to 1 mm.

As explained above, the fluorescent marker can, in particular, comprise at least one fluorescent dye. In particular, the fluorescent marker can comprise at least one lacquer, wherein the lacquer is configured to emit fluorescent light, in particular fluorescent light in the visible spectral range, under the influence of excitation light with at least one wavelength in the ultraviolet spectral range and/or in the blue spectral range.

In a further possible embodiment of the proposed method, in the comparison step, an evaluation of the result of the training step is carried out. Here, as explained above, contaminants not identified in the training step are checked to the extent of whether it was determined in the verification step that these contaminants were arranged at a point of the primary packaging means which cannot be seen, or can only be seen with difficulties, during the visual quality control. As explained above, this can, e.g., relate to a meniscus of at least one liquid of the amorphous product and/or at least one foam and/or a position between a closure of the primary packaging means and a wall of the primary packaging means, which cannot be seen, or can only be seen with difficulties, during the visual quality control. If such a situation is determined, it is possible, as explained above, for the training results to be reevaluated in accordance with this verification, for example by virtue of non-identified faults, in particular non-identified contaminants, which are classified as impossible to be seen, or only to be seen with difficulties, during the visual quality control not being taken into account, or only being taken into account with a lower weighting, when evaluating the training result than contaminants which are arranged at a point in the primary packaging means which can easily be seen during the visual quality control.

In a further embodiment of the proposed method, one or more of the primary packaging means of the test set can be removed from the test set and optionally be replaced by other primary packaging means, if it was determined in the verification step that the contaminants of said primary packaging means are arranged at a point of the primary packaging means which cannot be seen, or can only be seen with difficulties, during the visual quality control.

In a further aspect of this disclosure, a test set for training staff for quality control when filling amorphous products into primary packaging means is proposed. In particular, the test set can be configured for use in a method in accordance with one or more of the embodiments described above and/or in accordance with one or more of the embodiments yet to be described in detail below. Accordingly, reference can be made to the above description of the method for a plurality of embodiments of the test set. The test set comprises a plurality of primary packaging means filled with the product. At least one primary packaging means of the filled primary packaging means is afflicted by at least one contaminant, wherein the contaminant comprises at least one fluorescent marker.

In respect of optional embodiments, reference can be made to the description relating to the method. In particular, reference can be made to the description above in respect of possible embodiments of the amorphous product, the primary packaging means, in respect of possible embodiments of the test set with additional primary packaging means configured to be free from contaminants and further embodiments. In particular, the test set can comprise a number of primary packaging means, afflicted by faults, which are filled with the product and a number of primary packaging means, without faults, which are filled with the product. In turn, the number of primary packaging means, afflicted by faults, which are filled with the product can be subdivided into a number afflicted by contaminants, a number afflicted by other faults and a number afflicted by both contaminants and other faults. In this respect, and also in respect of possible sizes of these numbers, reference can be made to the description above. Furthermore, reference can be made to the description above in respect of the scope of the aforementioned numbers and/or in respect of the scope of the test set. Furthermore, reference can also be made to the description above in respect of possible embodiments of the particles.

Furthermore, the test set can comprise at least one documentation, which documents a fault affliction of the primary packaging means. By way of example, this can be the above-described optional documentation, which can be created in the provision step (method step a) and which is also referred to as test set documentation. By way of example, this documentation can be part of the test set, for example in paper form or in electronic form, for example on a data medium.

In a further aspect of this disclosure, a kit is proposed for training staff for quality control when filling amorphous products into primary packaging means. In particular, this kit can, in turn, be configured for use in a method in accordance with one or more embodiments described in detail above or described in detail in the following text. The kit comprises a test set in accordance with the preceding description. Furthermore, the kit comprises at least one excitation light source, in particular at least one UV light source, wherein the excitation light source is configured to emit excitation light with at least one wavelength in the ultraviolet spectral range and/or in the blue spectral range. By way of example, this excitation light source can be a UV lamp, which can be configured to be stationary or which can also, for example, be embodied as hand-held lamp.

In a further aspect of this disclosure, the use of a test set and/or of a kit in accordance with one or more of the above-described embodiments or in accordance with one or more of the embodiments yet to be described in more detail below, for training staff for quality control when filling amorphous products into primary packaging means is proposed.

In a further aspect of this disclosure, a method is proposed for producing a test set for training staff for quality control when filling amorphous products into primary packaging means. In particular, the test set can be configured for use in a method in accordance with one or more of the embodiments described above or yet to be described in more detail below. In the production method, a plurality of primary packaging means filled with the product are provided, wherein at least one primary packaging means of the filled primary packaging means is provided with at least one contaminant, wherein the contaminant comprises at least one fluorescent marker. By way of example, the amorphous product can be introduced into the primary packaging means and at least one contaminant can subsequently be additionally introduced into one or more of the primary packaging means, which contaminant has the fluorescent marker. By way of example, this can relate to one or more of the aforementioned contaminants. As an alternative or in addition to a subsequent introduction of the contaminants, the contaminant can also be introduced into the amorphous product before the latter is introduced into the respective primary packaging means. Various embodiments are possible.

Additionally, the production method can be embodied in such a way that at least one of the primary packaging means is provided with at least one further fault. Thus, as described above, at least one of the primary packaging means can be provided with damage, for example with at least one tear. Alternatively or additionally, at least one closure of at least one of the primary packaging means can be placed thereon and/or used in a faulty manner. In this manner, it is possible, within the scope of the production method, to produce a test set and/or a kit, in which one or more of the primary packaging means filled with the product has at least one fault, wherein the fault can be selected from the group consisting of at least one contaminant and at least one further fault.

Compared to known methods and devices, the proposed methods and devices have a multiplicity of advantages. In particular, training results can, according to this disclosure, be checked and evaluated more reliably and more exactly. In particular, incorrect assessments of the training result to the effect that the staff to be trained can not identify faults, in particular contaminants, with the means available to them can be avoided or at least corrected.

In particular, contaminants in the form of particles can be UV-marked by means of the fluorescent markers. In this manner, it is possible, if in doubt, to verify by illuminating the primary packaging means with excitation light as to whether or not the particle is definitely present, or whether it is held in the primary packaging means in such a hidden manner that it cannot be identified with the means available to the staff to be trained. As a result, a result of the training, in particular visual training, can be configured more precisely; in particular, it is possible to configure see-through training, i.e., training for visual control using a transparency of the primary packaging means and of the amorphous medium, in a more precise manner. Furthermore, unsuitable primary packaging means of the test set can be replaced when necessary.

In summary, the following embodiments are particularly preferred within the scope of this disclosure:

Embodiment 1

A method for training staff for quality control when filling amorphous products into primary packaging means, wherein the method comprises the following steps:
  a) at least one provision step, wherein, in the provision step, at least one test set of filled primary packaging means is provided, wherein the test set comprises a plurality of primary packaging means filled with the amorphous product, wherein at least one primary packaging means of the filled primary packaging means is afflicted by at least one contaminant, wherein the contaminant comprises at least one fluorescent marker;
  b) at least one training step, wherein, in the training step, the test set is presented to at least one person to be trained, wherein the person to be trained carries out a visual quality control for detecting contaminants, wherein the result of the training step is documented;
  c) at least one verification step, wherein, in the verification step, the test set is irradiated by excitation light, wherein fluorescing contaminants are detected, wherein the result of the verification step is documented; and
  d) at least one comparison step, wherein, in the comparison step, the result of the training step and the result of the verification step are compared.

Embodiment 2

The method as claimed in the preceding embodiment, wherein the amorphous product is selected from the group consisting of: a diagnostic agent, in particular a liquid diagnostic agent; a therapeutic agent, in particular a liquid therapeutic agent; a medicament, in particular a liquid medicament and particularly preferably a parenteral medicament.

Embodiment 3

The method as claimed in one of the preceding embodiments, wherein the primary packaging means comprise vessels, in particular vessels selected from the group consisting of: syringe bodies; phials; glasses; carpules.

Embodiment 4

The method as claimed in one of the preceding embodiments, wherein the plurality of primary packaging means filled with the amorphous product comprise similar, in particular identical, primary packaging means.

Embodiment 5

The method as claimed in one of the preceding embodiments, wherein, in the provision step, a documentation about the affliction of the filled primary packaging means with the contaminants is created.

Embodiment 6

The method as claimed in one of the preceding embodiments, wherein a plurality of the primary packaging means, of the test set, filled with the amorphous product are free from contaminants.

Embodiment 7

The method as claimed in one of the preceding embodiments, wherein the test set comprises a contaminant-free number of primary packaging means filled with the amorphous product and a contaminant-afflicted number of primary packaging means filled with the amorphous product.

Embodiment 8

The method as claimed in the preceding embodiment, wherein the contaminant-afflicted number of primary packaging means filled with the amorphous product forms a portion of 5% to 50% of all primary packaging means, of the test sets, filled with the amorphous product, in particular a portion of 10% to 40% and particularly preferably a portion of 20% to 30%.

Embodiment 9

The method as claimed in one of the preceding embodiments, wherein, furthermore, at least one primary packaging means of the test set is afflicted by at least one further fault, in particular a further fault selected from the group consisting of an incorrect closure of the primary packaging means and damage to the primary packaging means, in particular a tear.

Embodiment 10

The method as claimed in one of the preceding embodiments, wherein the test set comprises 10-1000 primary packaging means filled with the amorphous product, in particular 50-200 and particularly preferably 100.

Embodiment 11

The method as claimed in one of the preceding embodiments, wherein the at least one contaminant comprises at least one particle.

Embodiment 12

The method as claimed in the preceding embodiment, wherein the particle is selected from the group consisting of: at least one fiber; at least one hair; at least one chip, in particular at least one metal chip and/or at least one wood chip and/or at least one plastic chip; at least one glass particle; at least one wood particle; at least one metal particle; at least one ceramics particle; at least one plastic particle.

Embodiment 13

The method as claimed in one of the two preceding embodiments, wherein the particle has a diameter or equivalent diameter of 100 µm to 500 µm.

Embodiment 14

The method as claimed in one of the preceding embodiments, wherein the fluorescent marker comprises at least one lacquer, wherein the lacquer is configured to emit fluorescent light under the influence of excitation light with at least one wavelength in the ultraviolet spectral range and/or in the blue spectral range.

Embodiment 15

The method as claimed in one of the preceding embodiments, wherein, in the comparison step, an evaluation of the result of the training step is carried out, wherein, contaminants not identified in the training step are checked to the extent of whether it was determined in the verification step that these contaminants were arranged at a point of the primary packaging means which cannot be seen, or can only be seen with difficulties, during the visual quality control.

Embodiment 16

The method as claimed in one of the preceding embodiments, wherein one or more of the primary packaging means of the test set, for which it was determined in the verification step that the contaminants are arranged at a point of the primary packaging means which cannot be seen, or can only be seen with difficulties, during the visual quality control, are removed from the test set and optionally replaced by other primary packaging means.

Embodiment 17

A test set for training staff for quality control when filling amorphous products into primary packaging means, in particular for use in a method as claimed in one of the preceding embodiments, wherein the test set comprises a plurality of primary packaging means filled with the amorphous product, wherein at least one primary packaging means of the filled primary packaging means is afflicted by at least one contaminant, wherein the contaminant comprises at least one fluorescent marker.

Embodiment 18

A kit for training staff for quality control when filling amorphous products into primary packaging means, in particular for use in a method as claimed in one of the preceding embodiments relating to a method, wherein the kit comprises at least one test set as claimed in the preceding embodiment, wherein the kit furthermore comprises at least one excitation light source, in particular a UV light source, wherein the excitation light source is configured to emit excitation light with at least one wavelength in the ultraviolet spectral range and/or in the blue spectral range.

Embodiment 19

The use of a test set and/or a kit as claimed in one of the two preceding embodiments, for training staff for quality control when filling amorphous products into primary packaging means.

Embodiment 20

A production method for producing a test set for training staff for quality control when filling amorphous products into primary packaging means, in particular for use in a method as claimed in one of the preceding embodiments relating to a method, wherein, in the production method, a plurality of primary packaging means filled with the amorphous product are provided, wherein at least one primary packaging means of the filled primary packaging means is provided with at least one contaminant, wherein the contaminant comprises at least one fluorescent marker.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
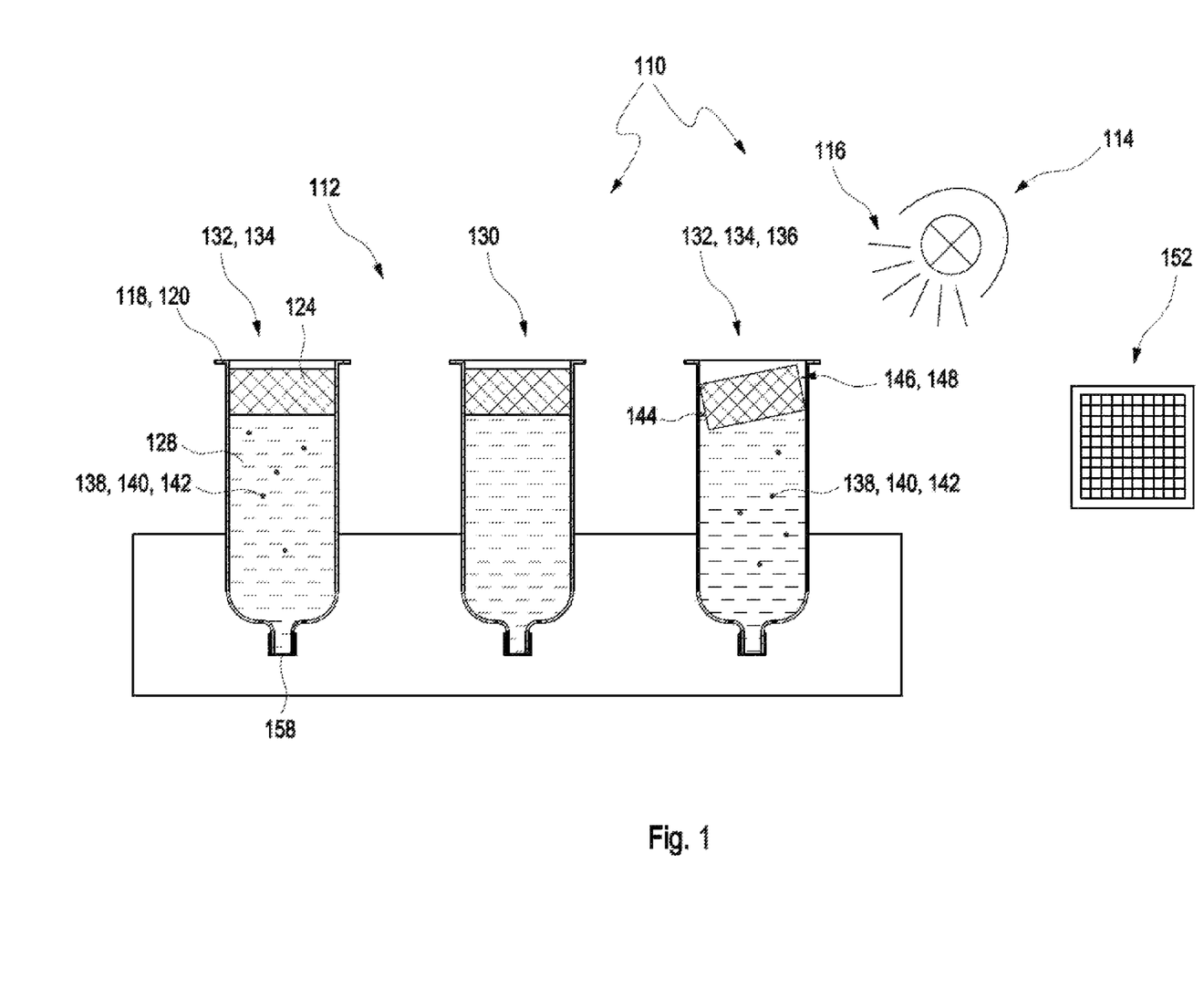
FIG. 1 shows a first exemplary embodiment of a test set according to this disclosure and of a kit according to this disclosure.
Figure 2:
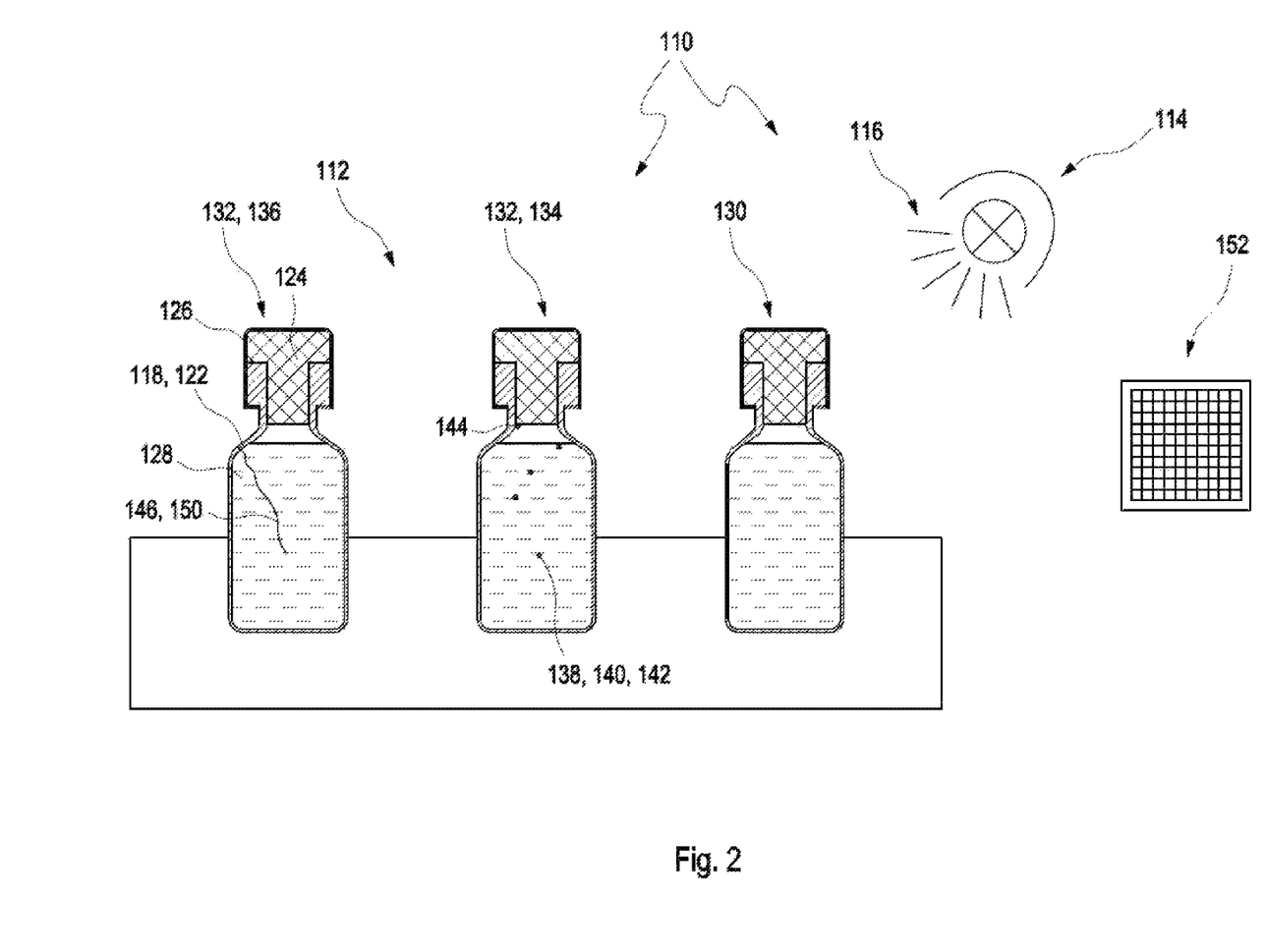
FIG. 2 shows a second exemplary embodiment of a test set according to this disclosure and of a kit according to this disclosure.

FIGS. 1 and 2 show various exemplary embodiments of kits 110 according to this disclosure in a very schematic illustration. The kits 110 in each case comprise a test set 112 for training staff for quality control, and an excitation light source 114 for emitting excitation light 116.

The test set 112 comprises a plurality of primary packaging means (primary packages) 118, which are embodied as syringe bodies 120 in an exemplary manner in the exemplary embodiment depicted in FIG. 1 and as phials 122 in an exemplary manner in the exemplary embodiment depicted in FIG. 2. In FIGS. 1 and 2, three primary packaging means 118 are respectively depicted in a symbolic and exemplary manner. However, in practice, the test set will generally comprise at least 10 primary packaging means 118 in each case, preferably at least 20 or even at least 50, for example 100-200 primary packaging means 118.

While the syringe bodies 120 can be sealed by means of, e.g., plugs 124, the phials 122 can, for example, be sealed by flanged caps 126 in addition to plugs 124. Other embodiments of the primary packaging means 118 are also feasible.

In the exemplary embodiments, the primary packaging means 118 are in each case filled with an amorphous product 128. This amorphous product 128 can, in particular, be a liquid, wherein use can be made of, for example, a test liquid or else a parenteral medicament. The amorphous product 128 preferably has a transparent embodiment.

In the depicted exemplary embodiments, the kits 110 in each case comprise a number from one or more fault-free primary packaging means 130 and a number from one or more fault-afflicted primary packaging means 132. The fault-afflicted primary packaging means 132 can in turn be distinguished between a number from one or more contaminants 134 and a number from one or more further faults. In the process, it is possible, as shown on the basis of the right-hand primary packaging means 118 in FIG. 1, for the numbers 134, 136 to have an intersection, i.e., to form a number of primary packaging means 118 which comprise both one or more contaminants and one or more further faults.

In FIGS. 1 and 2, the contaminants are denoted symbolically by reference sign 138. In particular, these contaminants 138 may comprise one or more particles 140. As explained above, these contaminants 138 are provided with at least one fluorescent marker 142. By way of example, this fluorescent marker 142 can be a UV-lacquer. Here, one and the same type of particles 140 can, for example, be provided with one and the same fluorescent marker 142; however, different types of contaminants 140 may also be provided with the same fluorescent marker 142. Alternatively or additionally, it is also possible to realize an option in this exemplary embodiment, or else in different exemplary embodiments, in which different types of contaminants 138 are provided with different types of fluorescent markers 142, for example with fluorescent markers which emit fluorescent light with different colors.

In respect to the contaminants 138, a distinction needs to made between contaminants which are easily visible with the naked eye and contaminants which are arranged in regions of the primary packaging means 118 which cannot easily be seen by the naked eye. These contaminants, which are also referred to as hidden contaminants 144 in the following text, can, for example, be contaminants, as shown in the right-hand primary packaging means 118 in FIG. 1 or the central primary packaging means 118 in FIG. 2, which are arranged in the region of a closure of the primary packaging means 118 and/or which are arranged in the region of a meniscus of the amorphous product 128 and/or in the region of a foam.

The primary packaging means 134 afflicted by further faults can in each case comprise one or more further faults 146, i.e., faults which are not caused by contaminants 138. As an example for further faults 146, FIG. 1 shows a faulty closure 148 in the right-hand primary packaging means 118 and a tear 150 or any other damage in the left-hand one of the primary packaging means 118 in FIG. 2.

Furthermore, the kits 110 can in each case comprise a documentation 152, which is indicated symbolically in each case in FIGS. 1 and 2 and in which the respective faults are listed for the respective primary packaging means 118 of the test set 112. By way of example, the documentation 152 can be available in electronic form and/or in paper form.

Figure 3:
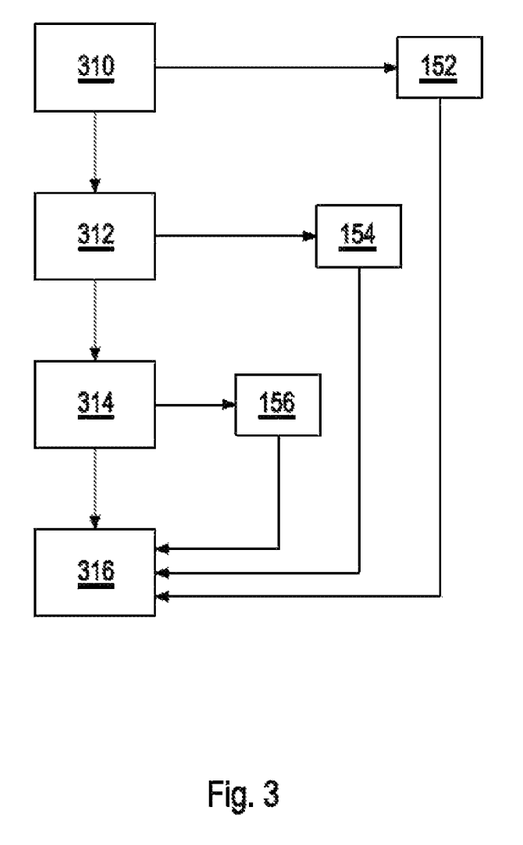
FIG. 3 shows a schematic flowchart of a method according to this disclosure for training staff for quality control.

FIG. 3 depicts, in a schematic manner as a flowchart, an exemplary embodiment of a method according to this disclosure for training staff for quality control when filling amorphous products into primary packaging means. The method comprises a provision step 310, in which a test set 112 is provided, for example in accordance with the exemplary embodiments in FIGS. 1 and 2. In particular, test set documentation 152 can also be created or provided within the scope of the provision of this test set 112.

Furthermore, the method depicted in FIG. 3 comprises at least one training step 312, in which the test set 112 is presented to at least one person to be trained. Here, the person to be trained carries out a visual quality control for detecting contaminants 138 and, preferably, other faults 146 as well. In the process, the result of the training step 312 is documented in training documentation 154.

Furthermore, the method depicted in FIG. 3 comprises at least one verification step 314. In this verification step, the test set 112 is irradiated by excitation light 116. By way of example, this irradiation can occur individually, in groups or as a whole. For this purpose, the primary packaging means 118 can, for example, be moved individually, in groups or as a whole relative to the excitation light source 114 such that the irradiation can take place. By way of example, the primary packaging means 118 can be introduced individually, in groups or as a whole into a light beam of the excitation light 116. In the process, the contaminants 138, which are provided with the fluorescent marker 142, are detected due to the fluorescing thereof. The detection can occur with the naked eye. Alternatively or additionally, use can also be made of one or more optical aids for detection, for example at least one magnifying glass and/or at least one microscope and/or at least one camera.

The result of the verification step is documented in verification documentation 156. Reference is made to the fact that the documentations 152, 154 and 156 can be embodied as separate documentations. Alternatively or additionally, these documentations 152, 154 and 156 can also be combined in pairs or as a whole to form common documentation.

Furthermore, the method depicted in FIG. 3 comprises at least one comparison step 316. In the comparison step 316, at least the results of the training step 312 and of the verification step 314 are compared to one another, for example by virtue of at least the documentations 154 and 156 being compared to one another, and preferably also the documentation 152.

In particular, hidden contaminants 144 can be determined in the verification step 314 and can be denoted accordingly in the verification documentation 156. By way of example, if deviations of the training result in accordance with the training documentation 154 from the test set documentation 152 are determined in the comparison step 316, these deviations can be checked on the basis of the verification documentation 156 and, optionally, be corrected. In this manner, training results in the form of a non-identification of hidden contaminants 144 can, for example, be left unconsidered when evaluating the training result or at least be provided with a lower weighting than the remaining training results. Furthermore, primary packaging means 118 which comprise hidden contaminants 144 can be removed from the test set 112 and can be replaced by other primary packaging means.

Exemplary Embodiment of a Production Method:

The following describes an exemplary embodiment of a production method for producing a test set 112. In this method, provision is initially made for a plurality of primary packaging means 118 in an unfilled state. Furthermore, provision is made for an amorphous product 128, for example in the form of a liquid and, preferably, in the form of a transparent liquid. Furthermore, provision is made for a plurality of similar different contaminants 138, in particular in the form of particles 140. These contaminants 138 are marked by a fluorescent marker 142. Furthermore, the amorphous product 128 is introduced into the primary packaging means 118. Subsequently, the contaminants 138 marked by the fluorescent marker 142 are introduced into one or more of the primary packaging means 118 of the test set 112 in a targeted manner, and the primary packaging means 118 are sealed. The fault-afflicted primary packaging means 132 are provided in this manner. Additionally, fault-free primary packaging means 130 can be provided such that the test set 112 can comprise a number of fault-free primary packaging means 130 and a number of fault-afflicted primary packaging means 132.

As a specific exemplary embodiment, use can be made of the use of syringe bodies 120. The syringe bodies 120 are closed by caps 158, as shown in an exemplary manner in FIG. 1. Subsequently, a predefined amount of liquid, for example water as amorphous product 128, is introduced into the syringe body 120, for example by means of a pipette.

In order to produce the contaminants 138, use can be made of, e.g., different types of particles 140. The particles 140 were marked with the fluorescent marker 142 by virtue of being immersed in a lacquer. The particles 142, created thereby and marked by the fluorescent marker 142, were introduced into individual ones or a number of the primary packaging means 118. Subsequently, the primary packaging means 118 were closed by the plug 128.

While exemplary embodiments have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE SIGNS

110 Kit
112 Test set
114 Excitation light source
116 Excitation light
118 Primary packaging means
120 Syringe body
122 Phials
124 Plug
126 Flanged cap
128 Amorphous product
130 Fault-free primary packaging means
132 Fault-afflicted primary packaging means
134 Primary packaging means afflicted by contaminants
136 Primary packaging means afflicted by other faults
138 Contaminants
140 Particles
142 Fluorescent markers
144 Hidden contaminants
146 Further faults
148 Faulty closure
150 Tear
152 Test set documentation
154 Training documentation
156 Verification documentation
158 Cap
310 Provision step
312 Training step
314 Verification step
316 Comparison step

What is claimed is:

1. A test set for training staff for quality control when filling amorphous products into primary packages, wherein the test set comprises a plurality of primary packages filled with the amorphous product, wherein at least one of the primary packages of the filled primary packages is afflicted by at least one contaminant, wherein the contaminant comprises at least one fluorescent marker and wherein at least one of the primary packages of the test set is afflicted by at least one further fault.

2. A kit for training staff for quality control when filling amorphous products into primary packages, wherein the kit comprises at least one test set as claimed in claim 1, wherein the kit further comprises at least one excitation light source, wherein the excitation light source is configured to emit excitation light with at least one wavelength in one or both of the ultraviolet spectral range and the blue spectral range.

3. The kit as claimed in claim 2, further comprising a UV light source.

4. A production method for producing a test set for training staff for quality control when filling amorphous products into primary packages, wherein, in the production method, a plurality of primary packages filled with the amorphous product are provided, wherein at least one of the primary packages of the filled primary packages is provided with at least one contaminant, wherein the contaminant comprises at least one fluorescent marker and wherein at least one of the primary packages of the test set is afflicted by at least one further fault.

5. The production method as claimed in claim 4 further comprising the step of using the test set to train staff for quality control when filling amorphous products into primary packages.

* * * * *